Sept. 22, 1970 C. F. TER BUSH ET AL 3,529,438
PRESSURE WATER COOLER CONSTRUCTION
Filed Jan. 9, 1969 2 Sheets-Sheet 1

United States Patent Office 3,529,438
Patented Sept. 22, 1970

3,529,438
PRESSURE WATER COOLER CONSTRUCTION
Charles F. Ter Bush, Grove City, and Eugene W. Scott, Columbus, Ohio, assignors to Westinghouse Electric Corporation, Pittsburgh, Pa., a corporation of Pennsylvania
Filed Jan. 9, 1969, Ser. No. 790,003
Int. Cl. B67d *5/62*
U.S. Cl. 62—394
8 Claims

ABSTRACT OF THE DISCLOSURE

A compact pressure water cooler construction in which the refrigeration system components and water system components are located in a space between a plate-like support floor carried from a back plate and an overlying basin, both the water cooling chamber and waste line assembly being sealed to and rigidly secured to the basin only.

CROSS REFERENCE TO RELATED APPLICATIONS

U.S. Patent applications 657,126 and 657,127 are directed to water cooling chambers which are particularly applicable to incorporation in a structure according to this invention because of their compactness.

BACKGROUND OF THE INVENTION

Field of the invention

The invention pertains to the art of pressure water coolers, typically provided with a bubbler to serve as a drinking fountain, and which have a self-contained refrigeration system for cooling the drinking water.

Description of the prior art

No prior art which is especially pertinent to the constructional mode according to this invention is known to applicants. The advantages of the construction according to the present invention may, however, be better appreciated if at least a general description of the constructional arrangement of typical pressure water coolers of the type provided with a bubbler to serve as a drinking fountain and which are wall mounted is at least briefly described. Such prior art coolers, such as the kind of exemplified by those manufactured by applicants' assignee, have typically had a frame type construction to which separate panels are fastened to form the cabinet. The cooling chamber and waste line assembly in these prior art coolers have typically been rigidly connected to and supported by the frame with the result that some difficulty has been experienced, when assembling the top basin to the remainder of the unit, in obtaining good seals at the connections between the water line and bubbler, and between the waste assembly and the basin. Further, the refrigeration compressor has typically been mounted at a higher or a lower level than the other components of the refrigeration system and the water system so that a subtantially height of unit has resulted.

SUMMARY OF THE INVENTION

In accordance with our invention, we provide a pressure water cooler construction in which a separate frame as such is eliminated. An upright back plate adapted to be hung on a wall and a support floor extending away from the plate lower edge are the main support elements and also define the back and bottom of the components space. The top wall of the component space is defined by the fountain basin, and all of the refrigeration system and the water system components are located in the space between the support floor and the basin. The upper end portions of the cooling chamber and of the waste line assembly are supported from and sealably secured to the basin. The lower end portions of the cooling chamber and waste line assembly are preferably related to the support floor in a manner which prevents only their rotation, but does not prevent their upward movement. This arrangement is advantageous in that it is easy to obtain a good water tight seal between the upper portions of these components and the basin, without unduly costly manufacturing tolerances being imposed.

The front and two opposite sides of the component space are covered by a one-piece wrapper bent into a U-shape, with both rear edges of the sides of the wrapper being attached to the back plate at two locations, and the front portion of the basin also being attached to the upper front corner of the two sides of the wrapper. Thus, the wrapper sides serve as gussets by virtue of the triangular outline formed by the points of attachment. This wrapper construction and associated unit construction also lend themselves to the wrapper being of a height that the sides and front extend down below the support floor sufficiently to hide the plumbing connections made immediately below the support floor, and access to these connections may be had without removing the wrapper.

DRAWING DESCRIPTION

DESCRIPTION OF THE PREFERRED EMBODIMENT

Figure 1:
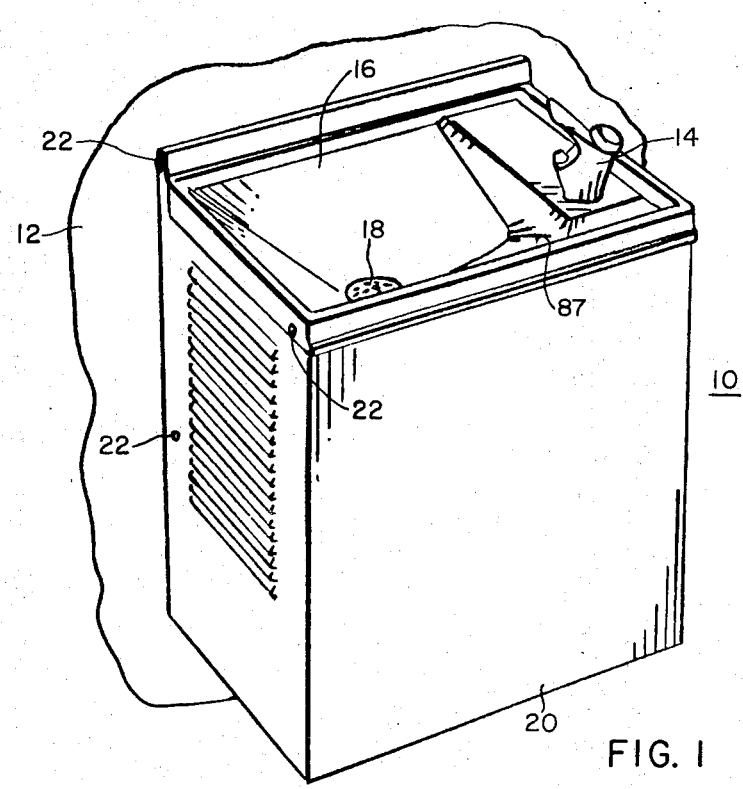
FIG. 1 is an isometric view of the pressure water cooler according to the invention mounted upon a wall.

In FIG. 1, a pressure water cooler according to the invention and generally designated 10 is mounted upon a building wall 12. The cooler is provided with a typical bubbler 14 mounted on the top wall of the cooler which takes the form of the basin 16 having a drain outlet 18 therein. The wrapper 20 which covers the front and opposite side walls of the cooler is also seen in FIG. 1, as well as the three locations designated 22 where the wrapper is secured to the back plate and to the basin on both sides of the cooler.

Figure 2:
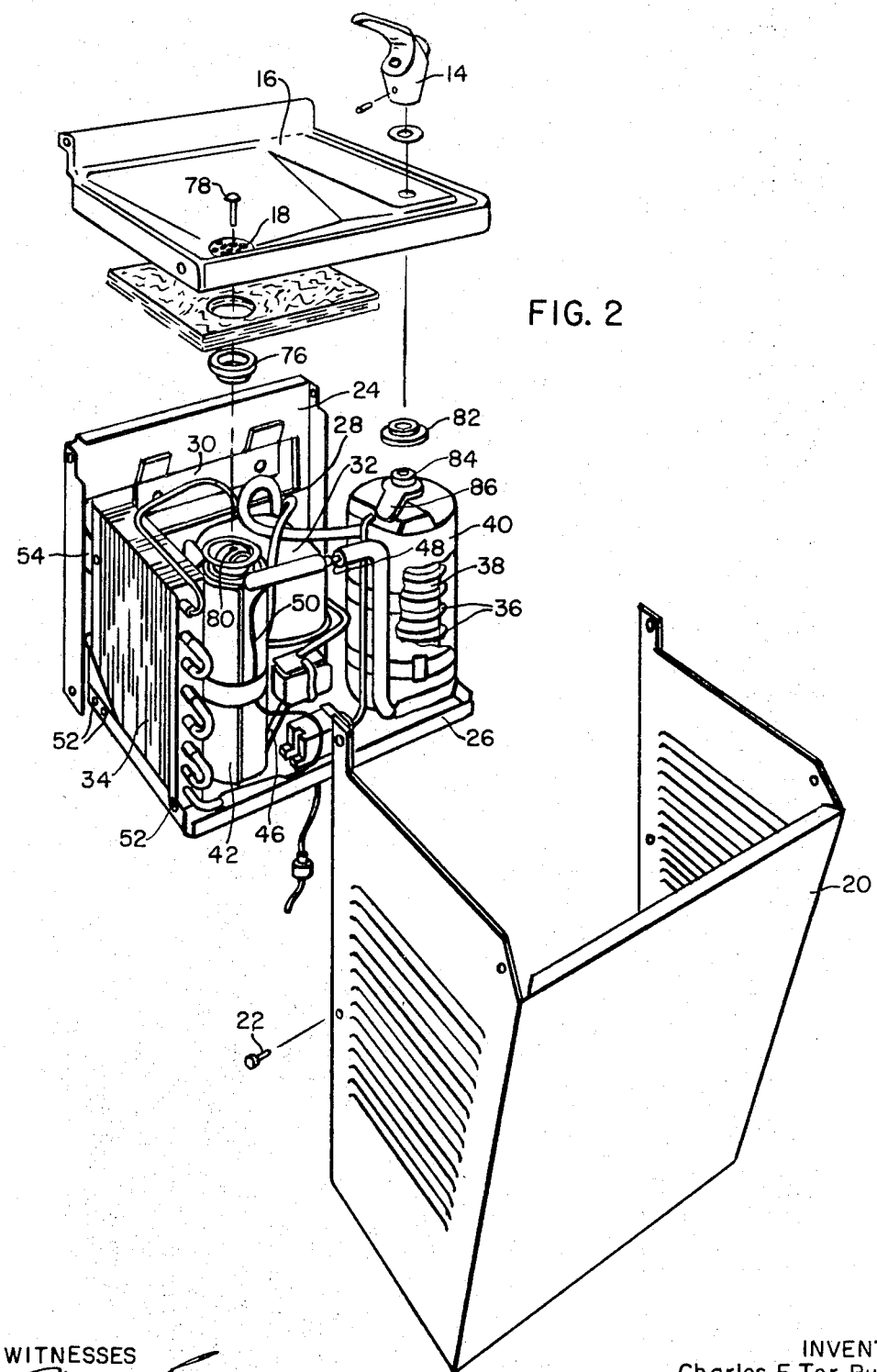
FIG. 2 is an exploded isometric view illustrating the locational relationship of most of the parts of the cooler according to the invention as the final assembly of parts is to be made.

Referring now to FIG. 2, the two basic support members of the cooler comprise the back plate 24 and the support floor 26 which may be formed of a single sheet of metal bent along an intermediate line and provided with flanges along all of the edges. A cut-out portion 28 is provided in the back plate, the upper edge of the cut-out seating upon a wall mounting bracket 30 which in turn is fastened to the building wall 12, and has a pair of upwardly and forwardly inclined tabs projecting through the cut-out.

The interior or components space of the cooler is defined at the bottom and top by the support floor 26 and the basin 16, respectively, at the back by the back plate 24, and at the front and side by the wrapper 20. This component's space contains a refrigeration system, and a water system. The refrigeration system components include a refrigerant compressor 32, a refrigerant condenser 34, evaporator or cooling coils 36 encircling the water chamber 38, and the refrigerant conducting lines. The water system components include the cooling chamber 38, the waste line assembly generally designated 42, and the water conducting lines. In the illustrated arrangement, conventional precooling of the inlet water is provided by leading the water supplied to the cooler in a spiral around the drain conduit of the waste line assembly before passing the water to the cooling chamber 38. It will be appreciated that the precooling is an optional feature of the structure according to the invention, and the arrangement of water lines where precooling is not utilized will be described in connection with the description of the lower portion of the cooling chamber and FIG. 4.

When the precooling feature is utilized, the supply water is admitted through an inlet fitting mounted in a hole 44 (FIG. 3) in the support floor, then through line 46 which leads to the bottom of the waste line assembly and spirals upwardly about the drain conduit, the precooled water then passing over and down through line 48 to the lower portion of the cooling chamber 38. With precooling, insulated jackets are used to encase both the waste line assembly and the water line 48. The structural arrangement also lends itself to extending the capillary tube 50 along with the water line 48 over to the cooling chamber to support and protect the tube, and incidentally to obtain a heat exchange relationship between the tube and water line.

In accordance with one feature of the invention, the condeser 34 is arranged along one side of the component space in an upright disposition and is attached to both the support floor and the back plate in a fashion that the condenser itself performs a gusseting function. These attachment locations are designated 52 in FIG. 2 and include one near the front lower corner of the condenser through the upright flange at the edge of the support floor, and one through a tab 54 which is formed out of the material from the cut-out 28 in the back plate 24.

Figure 3:
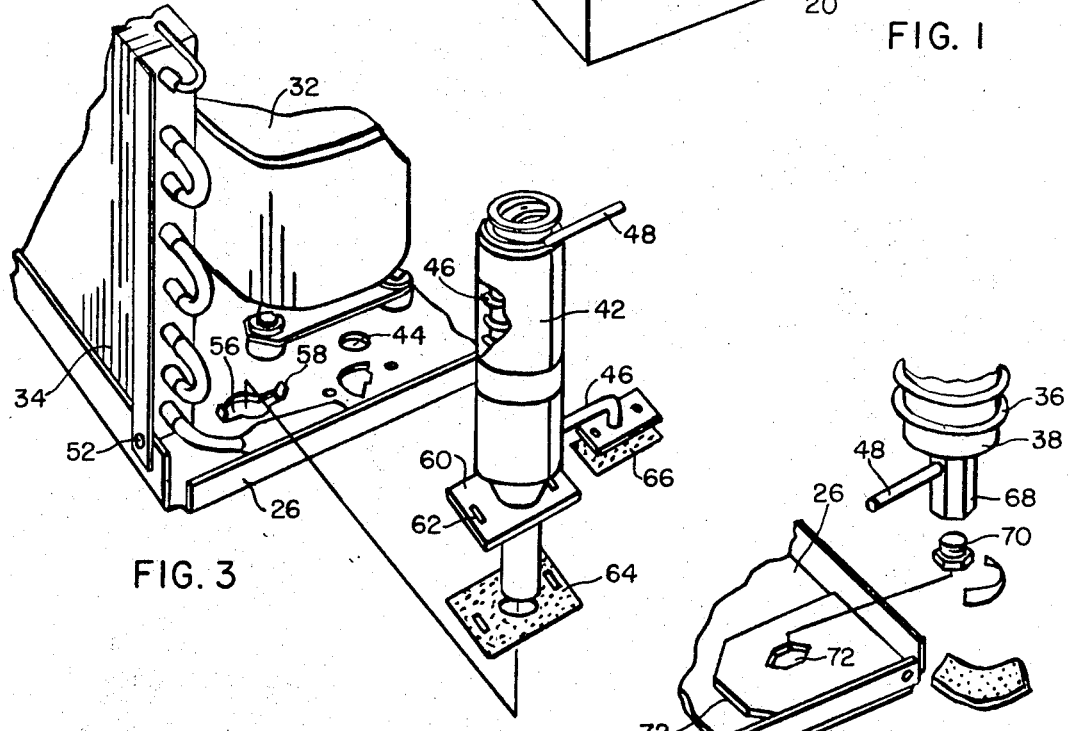
FIG. 3 is a fragmentary and exploded isometric view illustrating the parts at the lower left corner of the support floor before the waste line assembly is placed.

The constructional arrangement according to the invention also includes the manner in which the cooling chamber assembly and the waste line assembly are tightly and sealingly secured against water leakage to the top basin 16, and have their lower portions related to the support floor in a manner that these assemblies are permitted to have limited upward movement relative to the support floor. In that connection, in FIG. 3 it may be seen that a cut-out 56 is provided near the front left corner of the support floor 26, the cut-out having a central circular portion and a pair of opposite wing portions with upwardly projecting tabs 58. The bottom portion of the waste line assembly carries a rectangular plate 60 secured thereto and having opposite slots 62 provided therein to receive the upstanding tabs 58, the length of the drain conduit below the plate extending down through the support floor for connection to a building drain line. Thermal insulating pads 64 and 66 as shown in FIG. 3 underlie the plate 60 for the waste line assembly and the plate associated with the water inlet line 46. These insulating pads prevent sweating of the support floor near the areas subject to being chilled. It will be appreciated then that the waste line assembly may be seated upon the support floor with the tabs 58 being received in the slots 62 to prevent rotation of the waste line assembly when the tight sealing connection is made at the top portion of the waste line assembly, but the means for mounting the lower portion of the waste line assembly to the support floor does not prevent movement of the waste line assembly up from the floor when the connection is made at the top.

Figure 4:
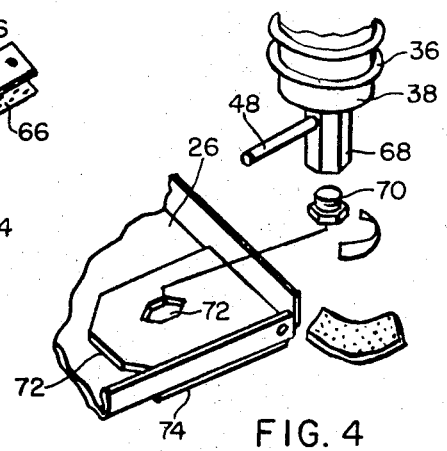
FIG. 4 is a fragmentary and exploded isometric view showing the parts at the lower right corner of the support floor before the cooling chamber assembly is set.

The means for insuring that the cooling chamber is also held in the non-rotative position, but is permitted to be moved vertically, is illustrated in one preferred form in FIGS. 2 and 4. The lower end of the cooling chamber 38 has a hollow hex-shape fitting 68 secured thereto, which extends in part below the support floor and affords the plumber means for holding the fitting against rotation with a wrench. The water inlet line 48 (if the precooling feature is used) is connected to the interior of the hex fitting, and the bottom end of the hex fitting receives a plug 70. The front right corner of the support floor 26 has an opening 72 which preferably is hex-shaped into which the hex fitting 68 is slidably received. Thus the cooling chamber seats upon the support floor at the assembly stage shown in FIG. 2, but may be pulled upwardly as necessary when its upper end is fastened to the basin. Thermal insulating pads 74 are provided on both faces of the support floor to cover the areas around the location where the cooling chamber contacts the support floor.

Returning now to FIG. 2, with the refrigeration system, and the water system installed in the component space to the extent shown in FIG. 2, the cooler is in condition to receive the top basin 16. The rear edge of the basin is simply rested upon the top edge of the back plate 24 while the waste line and cooling chamber assemblies are sealed to the top basin.

To seal the top of the waste line assembly to the under side of the basin 16, a bushing 76 (FIG. 2) of resilient material and having the general shape of a short cylinder with an outwardly-directed encircling flange is first seated upon the top end of the waste line. Then a screw 78 is turned down through the waste outlet 18 strainer and into a threaded opening in a strap 80 extending across the open top of the drain conduit. It will be appreciated that the screw may be tightened conveniently while the waste line assembly is held against rotation by virtue of its lower portion connection to the support floor. However, the connection at the bottom permits the waste line assembly to be pulled up tightly to provide the water tight seal between the basin and the top of the waste line assembly.

For sealing the upper end of the cooling chamber 38 with the underside of the basin, and the bubbler assembly 14, gasket 82 (FIG. 2) is seated upon the exteriorly threaded fitting 84 at the top of the cooling chamber. The lower end of the bubbler 14, which is provided with interior threads, is simply turned on to the threaded fitting 84. To insure that the connection between the threaded fitting 84 and the cooling chamber proper 38 is not broken during this operation, and to hold the cooling chamber against rotation, a key-shaped member 86, which is strongly secured to the fitting 84, is disposed to seat in the upwardly embossed portion 87 of the basin so that when the bubbler 14 is turned on the fitting 84, the key 86 locks the fitting and the chamber against rotation. Again, it will be seen that with this arrangement, a water tight seal may be obtained between the bubbler basin and upper portion of the cooling chamber with the chamber being pulled up from the floor 26 to the degree necessary.

After the basin is fitted and sealed to the top ends of the waste line in the cooling chamber, the wrapper 20 is assembled to the structure. At this time of course the basin is secured to the cooler only at the upper ends of the waste line assembly and the cooling chamber. The rear edge of the basin simply rests upon the upper edge of the back plate 24. The upper edges of the wrapper are slipped inside the depending flanges on the front edge and opposite side edges of the basin, and fasteners (also 22) attach the wrapper to the back plate at each lower rear corner, at each upper rear corner, and at each upper front corner. Thus the wrapper, by virtue of its three point triangular attachment to the back plate and the basin provides a gusseting function itself. While the gusseting function could be performed if the wrapper were not a one piece item, but rather were comprised of a separate panel for each opposite sides and the front, it is preferred from a cost standpoint to provide the wrapper as a one piece member.

Further in accordance with the invention, the wrapper is of a height that its lower portion extends substantially below the support floor when the wrapper is assembled to the cooler, and this downward extension hides the plumbing connections which are made immediately below the support floor. The one piece wrapper construction is also advantageous in this respect in that the opposite sides and the front of the wrapper stiffen each other.

Where the water cooler does not use a precooler, the plug 70 (FIG. 4) is removed from the cooling chamber lower end hex fitting 68, and the inlet line 48 is either omitted, or the stub end at the hex fitting is crimped and soldered. Thus the flow arrangement of this particular water cooling chamber, in which water enters the bottom irrespective of whether a precooler is or is not used, and exits at the top, lends itself well to the constructional mode of the water cooler according to this invention. The preferred cooling chamber construction is that disclosed in the noted copending applications. However, it is noted that the cooler chamber assembly may take other forms, and may even include the instantaneous type in which the chamber is simply the water tube, and the refrigerant tubing parallels the water tube in heat exchange relation. Such an arrangement gives rapid cooling but lacks storage capacity.

To summarize the advantages of the invention, the construction as a whole permits the omission of a frame as such, and utilizes the back plate, support floor, the gusseting function of the condenser, and the gusseting function of the wrapper to provide a sturdy construction. The construction also permits the cooling chamber assembly and the waste line assembly to be essentially free floating in a vertical direction so that a tight seal may be obtained at the top ends of both to the basin without imposing unduly restrictive manufacturing tolerances upon the production of the various parts involved. The system lends itself to complete drainage of the water circuit. Finally, while the construction according to the invention is practically attractive in connection with compact, wall-mounted, pressure water coolers, the construction may also be used in connection with a floor or counter mounted water cooler, with the provision of course that the wrapper be of a height commensurate with the level of the support surface and intended height of the bubbler.

What is claimed is:
1. A pressure water cooler construction comprising:
   a water cooler component space defined by an upright back plate, a support floor projecting forwardly from the lower edge of said back plate, a top wall forming a basin, and wrapper means for covering the other exposed sides of said space;
   a water system in said space including a cooling chamber assembly and a waste line assembly, both of which depend from said basin;
   a refrigeration system in said space including a compressor, condenser, and cooling coils in heat transfer relation with said water cooling chamber assembly;
   all the components of said refrigeration system and of said water system being mounted in said component space with at least their major portions on the upper side of said support floor and below the lower side of said basin; and
   means for rigidly and sealably securing the upper portion of at least one of said cooling chamber assembly and said waste line assembly to said basin, said assemblies being unattached to said support floor in any manner that would prevent their vertical movement.
2. A construction according to claim 1 including:
   means for holding said cooling chamber assembly and said waste line assembly against rotation.
3. A construction according to claim 1 wherein:
   said condenser is mounted in an upright disposition along one side of said space, said construction includes means attaching said condenser to said support floor and said back plate at least at locations generally outlining a triangle with the junction of said floor and back plate so that said condenser serves as a gusseting brace.
4. A construction according to claim 1 wherein:
   said back plate and said support floor comprise a one piece member bent along an intermediate line to provide a substantially right angle relation between said back plate and said support floor.
5. A construction according to claim 1 wherein:
   said cooling chamber is of the character receiving water at its lower portion and having an outlet at its upper end.
6. A construction according to claim 1 wherein:
   said wrapper comprises a one piece member formed into a generally U-shape having an open top, bottom and rear, and
   means for securing the rear edges of said wrapper along each side of said back plate, and means for securing each of the top forward corners of said wrapper to a stop forward corner of said basin so that said wrapper is supported from said back plate, and said basin is supported at its forward edge from said wrapper.
7. A construction according to claim 6 wherein:
   the lower margin of said wrapper extends downwardly past said support floor a sufficient distance to hide the plumbing connections to said water cooler from normal view.
8. A construction according to claim 7 wherein:
   the bottom edges of said wrapper lie in a horizontal plane to permit said bottom edges to rest upon a planar horizontal surface to support said water cooler construction.

References Cited

UNITED STATES PATENTS 3,033,007  5/1962  Lyman _____ 62—391
3,069,872  12/1962  Sovensen _____ 62—391

MEYER PERLIN, Primary Examiner

U.S. Cl. X.R.

62—399